April 26, 1960  M. SCHWARZ ET AL  2,934,682
ELECTROLYTES
Filed July 5, 1956
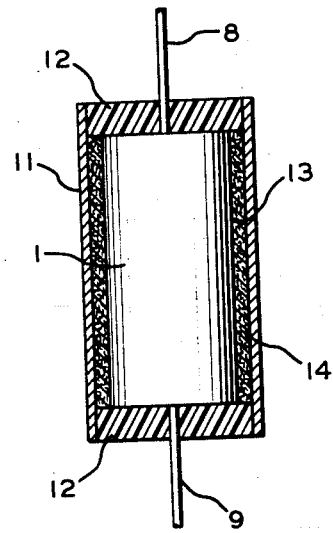
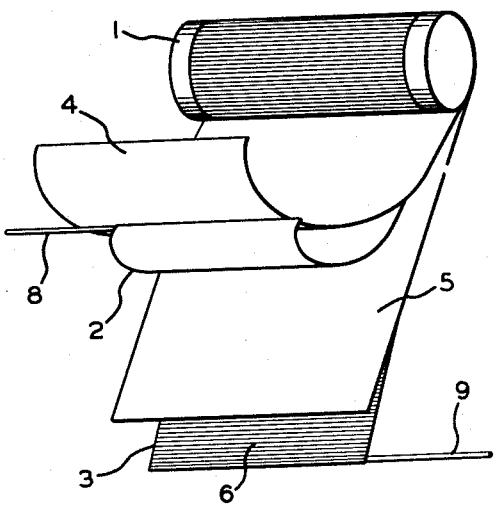
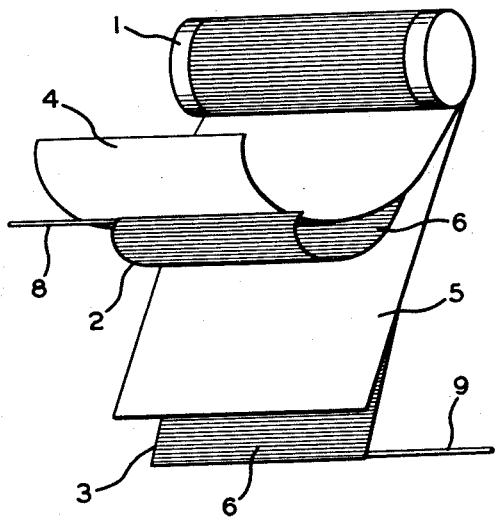
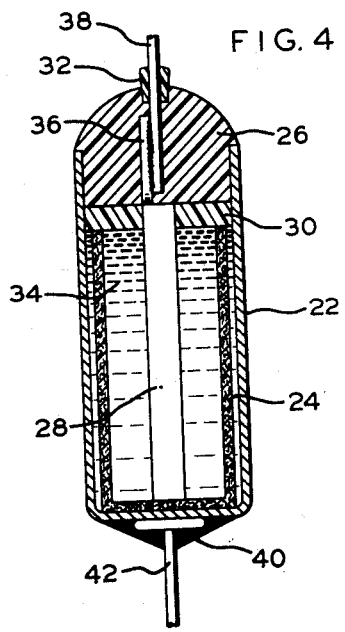
INVENTORS
SIDNEY D. ROSS
MEYER SCHWARZ
BY Roland A Dexter
THEIR ATTORNEY

United States Patent Office 2,934,682
Patented Apr. 26, 1960

2,934,682
ELECTROLYTES

Meyer Schwarz, Washington, D.C., and Sidney D. Ross, Williamstown, Mass., assignors to Sprague Electric Company, North Adams, Mass., a corporation of Massachusetts Application July 5, 1956, Serial No. 595,957

6 Claims. (Cl. 317—230)

This invention relates to the new and improved type of electrolyte. More particularly it relates to a non-aqueous electrolyte which is particularly advantageous for use in electrolytic capacitors.

In electrolytic capacitors a primary limitation upon their utility is the nature of the conducting medium commonly called the electrolyte. The commonly used inorganic aqueous systems such as solutions of various inorganic salts, acids or bases, have many inherent disadvantages, not the least of which is that they cannot be employed over an extensive temperature range. Regardless of this limitation which is inherent in the solvent of such systems, the capacitor industry has almost universally accepted an electrolyte for electrolytic capacitors which consists of viscous mixtures of polyhydric alcohols, water and either boric acid or salts, such as ammonium pentaborate. It is thus apparent that the temperature range of operation must be limited to the liquid range of the primary solvent, that is water.

It is therefore an object of the present invention to produce an electrolytic capacitor employing an electrolyte, non-aqueous in nature, which can be used over an extremely wide temperature range and which device exhibits excellent electrical characteristics and stability.

A further object of the invention is the fabrication of an electrolytic capacitor containing a non-aqueous electrolyte suitable for operation in the temperature range in excess of 125° C. to —60° C. without material change of electrical characteristics over this range.

Further objects of this invention, as well as the advantages of it, will be apparent from the specification and appended drawings in which Fig. 1 is a front elevation, in section, of a rolled foil type electrolytic capacitor, sealed within a can; Fig. 2 and Fig. 3 are perspective views of the condenser unit of Fig. 1 removed from the can and partly unrolled to show its construction with the former section of the polarized type and the latter section of the non-polarized type; and Fig. 4 is a front elevation, in section, of an electrolytic capacitor having a wire anode.

Briefly the objects were achieved in accordance with the invention by the incorporation of an electrolyte comprising alkyl ammonium salts of alkyl esters of phosphorus containing acids, which acids include tetraphosphoric acid, orthophosphoric acid, phosphinic acid, phosphonic acid and pyrophosphoric acid, dissolved in a non-aqueous solvent, into a capacitor structure comprising a plurality of electrodes separated by a porous spacer, at least one of said electrodes coated with an oxide dielectric layer.

It has been discovered that a class of alkylamine salts of organo phosphorus containing acids dissolved in non-aqueous solvents cooperate with conventional electrolytic capacitor structures to produce a device of unique electrical characteristics over an extended operational temperature range which limits are in excess of 125° C. and below —60° C. Further, this device has shown exceptional stability over extended periods of non-operational time and extended operational life, particularly for alternating current applications.

The cation of the solute of the electrolytic system embraces alkyl substituted amines which amines include primary, secondary and tertiary types. The anion of the solute has been described as organo phosphorus containing acids which are salified by reaction with an aliphatic or aromatic amine.

The anion which is the organo phosphorus containing acid is hereinafter set forth as a plurality of classes which define the full scope of the invention:

Tetraphosphates

The solute is obtained by reacting phosphorus pentoxide with three molar equivalents of an aliphatic alcohol and three molar equivalents of a tertiary amine. The resultant product has the following general formula:

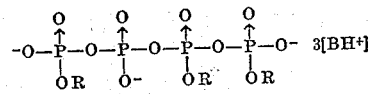

wherein R is any alkyl or hydroxy substituted alkyl group and B is any tertiary amine. The alkyl groups suitable for the tetraphosphates and the other phosphorus containing acids set forth as part of this invention include methyl, ethyl, propyl, butyl, amyl, hexyl, heptyl, octyl, nonyl, decyl and hydroxy derivatives thereof. The alkyls and hydroxy substituted alkyls can be defined, for the purposes of this disclosure, lower alkyls, that is alkyls having up to ten carbon atoms. The tertiary amines include both lower alkyl and hydroxy lower alkyl amines preferably including up to about six carbon atoms, as tripentanolamine, tripentylamine, tributanolamine, tributylamine, tripropylamine, tripropanolamine, triethanolamine, triethylamine and trimethylamine. A member of the tetraphosphate group, tri-(triethylammonium)-trimethyl-tetraphosphate, was prepared by the reaction of triethylamine, methanol and phosphorus pentoxide. Other representative compounds include: tris-(tri-n-butylammonium) tris-($\beta$-hydroxyethyl)-tetraphosphate which is the product of the reaction of tri-n-butylamine, ethylene glycol and phosphorus pentoxide; tris-(tri-n-butylammonium)-tri-n-amyl-tetraphosphate which is the product of the reaction of tri-n-butylamine, n-amyl alcohol and phosphorus pentoxide; tris(tri-n-amylammonium)-tri-propyl-tetraphosphate which is the product of the reaction of tri-n-amylamine, propanol and phosphorus pentoxide.

Orthophosphates

This group has a general formula:

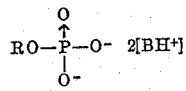

where R is an alkyl or hydroxy substituted alkyl group and B is any aliphatic amine. For the orthophosphates, di-substituted orthophosphates, phosphonates, phosphinates and pyrophosphates the aliphatic amines include not only tertiary amines, but also primary and secondary. The useful amines are the hydroxy substituted alkyl and lower alkyl, that is containing upwards of six carbon atoms in each alkyl group. Representative ones are dipropylamine, tripropylamine, dibutylamine, tributylamine, dipentylamine, propanolamine, dipropanolamine, butanolamine, di-butanolamine, tributanolamine, hexylamine, dihexylamine, trihexylamine, ethanolamine, diethanolamine, triethanolamine, pentanolamine, dipentanolamine, tripentanolamine, hexanolamine, dihexanolamine, trihexanolamine. This product is generally prepared by reacting three molar equivalents of a mono or poly alcohol with phosphorus pentoxide, neutralizing the mixture with an amine and thereafter separating it from the dialkyl product which is an additional product of the reaction. Representative examples of this group include: bis-(triethylammonium)-monoethyl orthophosphate, the reactants of which are ethyl alcohol and phosphorus pentoxide, subsequently neutralized with triethylamine; bis-(di-butylammonium) monopropyl orthophosphate, the reactants of which are propanol and phosphorus pentoxide, subsequently neutralized by dibutylamine; bis-(ethanolammonium) monohexyl orthophosphate, the reactants of which are hexanol, phosphorus pentoxide and ethanolamine; bis-(n-butylammonium) monoethyl orthophosphate of which reactants are ethanol, phosphorus pentoxide and n-butylamine.

A better preparative method is to react phosphorus oxychloride with one equivalent of an alcohol, the resulting dichloride is solvolyzed with two equivalents of water and neutralized with an amine.

Di-substituted-orthophosphates

This group has a general formula:

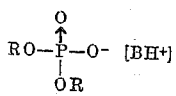

where R is any alkyl or hydroxy substituted alkyl group and B is any aliphatic amine. As pointed out above, this product is also produced by the reaction of phosphorus pentoxide and an alcohol or a glycol, subsequently neutralized by an aliphatic amine. Representative materials include, tri-ethylammonium diethylorthophosphate, the reactants of which are ethyl alcohol and phosphorus pentoxide, neutralized with triethylamine; di-butylammonium di-n-monyl orthophosphate, the reactants of which are nonanol and phosphorus pentoxide, neutralized with dibutylamine; ethanol ammonium di-β-hydroxyethyl orthophosphate, the reactants of which are ethylene glycol and phosphorus pentoxide, subsequently neutralized by ethanolamine. A better preparative method is to react phosphorus oxychloride with equivalents of an alcohol. The resulting monochloride is treated with water and neutralized with an amine.

Phosphonates

This group contains a carbon-to-phosphorus bond and has a general formula:

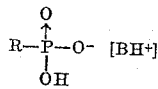

where R is any alkyl, aryl or alkaryl group and B is any aliphatic amine. Representative compounds of this group include tri-ethylammonium benzenephosphonate; dibutylammonium methylphosphonate; and ethanolammonium benzylphosphonate. It is apparent that the organic substituted phosphonic acid is neutralized with the alkyl amine. In the phosphinates as well as the phosphonates, the aryl group can be phenyl and the alkaryl groups can be benzyl and ethylphenyl.

Phosphinates

This group is of the alkyl ammonium salts of alkyl phosphinic acids which have the general formula:

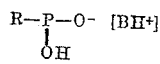

where R is any alkyl, aryl or alkaryl group and B is an aliphatic amine. Representative compounds include hexanolammonium benzenephosphinate; tri-ethylammonium methylphosphinate; and, dibutylammonium benzylphosphinate.

Pyrophosphates

This group includes the dialkyl esters of pyrophosphoric acid which have the formulae of

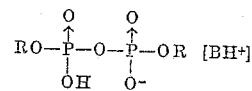

for the mono acid pyrophosphate, and

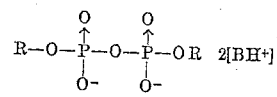

for the di-acid pyrophosphate. In these formulae R is any alkyl or hydroxy substituted alkyl group and B is aliphatic amine. Representative compounds of the mono amine salts of these di-substituted acid pyrophosphates include tri-n-butylammonium di-n-octyl monoacid pyrophosphate, triethylammonium dimethyl monoacid pyrophosphate; dibutylammonium dihexyl monoacid pyrophosphate; and, ethanolammonium didecyl monoacid pyrophosphate. Representative compounds from the diamine salts of di-substituted pyrophosphates include bis-(triethylammonium) dimethylpyrophosphate; bis-(dibutylammonium) diheptylpyrophosphate; and, bis-(ethanolammonium) dipropylpyrophosphate.

Numerous non-aqueous solvents can be used to excellent advantage in practicing the concept of this invention. For best results, these solvents should be liquid, either at −55° C. or 150° C., or a liquid range of −55° C. to 150° C., a dielectric constant greater than about 10 and of course should exhibit suitable solvent power for the solutes set forth above. Such solvents include butanol, propylene glycol, diethylene glycol, triethylene glycol, 1,4-butane diol, ethylene glycol and dimethyl formamide. Of those set forth above, dimethyl formamide has been found unique. Dimethyl formamide in combination with these solutes set forth above exhibits excellent low temperature characteristics, that is at temperatures of −60° C. and lower, excellent operational life both in polarized and non-polarized electrolytic capacitor constructions, and excellent stability over extended periods of non-operational shelf-life.

In the form of capacitors shown in Figs. 1, 2 and 3, the condenser unit 1 is of the rolled foil type being made up of a pair of foils 2, 3 formed of a film-forming metal such as tantalum, aluminum and zirconium, spaced from one another by layers 4 and 5 of a low density condenser paper, such as kraft paper. In Fig. 2, which is directed to the polarized electrolytic construction, the anode 3 has an oxide film 6 on a surface, while the cathode foil 4 does not have an appreciable dielectric oxide coating. The non-polarized unit of Fig. 3 for alternating current applications, has an oxide dielectric film 6 on both of the electrode foils 3 and 4. The assembly of foil and kraft paper is rolled into a compact cylinder. Metal terminals 8 and 9 preferably formed of the same metal as the foils are fastened to the ends of the respective foils as by spot welding or crimping.

The condenser unit 1, impregnated with the electrolyte of the invention, is enclosed in a tubular can 11 of a suitable non-corrosive metal such as silver or silver plated copper. The can 11 passing through a resinous end seal 12 which confines the electrolyte to the wound section. Positioned against the inner surface of the tubular can 11 is a tube of kraft paper 13 which is saturated with the electrolyte 14.

In the form of the condenser shown in Fig. 4, the anode is in the form of an oxide coated etched or unetched wire of the film-forming metals previously set forth. The wire may be spiralled or straight depending upon the total capacity required. The anode is placed in an outer tubular can 22 of a non-corrosive metal such as silver. Within the can 22 is a spacer structure in the form of a paper tube 24 and a paper spacer disc 26 cooperating to cover the inner surfaces of said can. The anode shown here in the form of a straight wire 28 has one end placed against the spacer disc 26 and its other end filled with an encircling resin gasket 30 that can be pushed into the can. The paper tube 24 is short enough to permit the gasket 30 to be forced into the can and leave above it at least a millimeter or so of height to receive and anchor a plastic seal 30. Prior to placing the anode wire 28 into the can, the electrolyte of the invention designated 34 is placed in the container and the outer end of the anode wire 28 flattened as shown at 36. Also before insertion of the anode wire 28, a flexible lead wire 38 of nickel for example can have its end welded to the flattened portion 36, preferably by a spot weld. To the outside of the blind end of the can 22 there is fastened by solder 40 another lead wire 42.

A number of typical examples in the practice of the invention are given below:

An electrolytic capacitor of the type shown in Figs. 1 and 2 was produced out of two unetched tantalum foils 0.5 mil in thickness, convolutely wound with a spacer consisting of two layers of 0.5 mil thick uncalendered kraft paper. The anode was electrochemically formed to 300 volts in a 0.1% phosphoric acid solution at 90° C. The wound section was placed in an aluminum can having a resin end seal and to each of the foils, that is the anode and cathode, were spot welded 20 mil thick flattened tantalum wire as the leads.

An electrolyte consisting of 10% by weight of tris-(triethylammonium) trimethyl-tetraphosphate dissolved in dimethylformamide and having a conductivity at 26° C. of about 1000 ohm-centimeters was vacuum impregnated into the section. This unit had a capacity of 1.5 mfds. and a working voltage of 150 volts. The completed unit was found to have an extremely wide operational temperature range, that is from −55° C. to +125° C. with relatively constant capacitance and low dissipation factor over it.

Similar results are possible with the following electrolytes when used in the capacitor structure above, which capacitor electrodes can be of any of the various film-forming metals and both of foil and wire construction:

1% by weight of tris-(tri-n-butylammonium) tris-(β-hydroxy ethyl) tetraphosphate dissolved in 99% by weight of diethylene glycol;

4% by weight of tris-(tri-n-butylammonium) tri-butyl tetraphosphate dissolved in 96% by weight of 1,4-butane diol;

5% by weight of bis-(tri-ethylammonium) monoethyl-orthophosphate dissolved in 95% by weight of triethylene glycol;

10% by weight of bis-(dibutylammonium) monobutyl-orthophosphate dissolved in 90% by weight of butanol;

20% by weight of tri-ethylammonium diethylorthophosphate dissolved in 80% by weight of triethylene glycol;

3% by weight of triethylammonium benzene phosphonate dissolved in 97% by weight of dimethylformamide;

5% by weight of ethanolammonium benzylphosphonate dissolved in 95% by weight of diethylene glycol;

2% by weight of hexanal ammonium benzene phosphinate dissolved in 98% by weight of ethylene glycol;

20% by weight of tri-n-butylammonium di-n-octyl monoacid pyrophosphate dissolved in 80% by weight of dimethylformamide, which had a remarkably low resistivity at −50° C. and less than 5% decrease in capacity from room temperature;

20% by weight of bis-(tri-ethylammonium) methyl pyrophosphate dissolved in 80% by weight of propylene glycol.

In the utilization of the various solutes set forth in this specification with any of the indicated solvents, consideration must be given to two fundamental aspects, namely the level of solubility required for any desired application, that is the resistivity of the system and the temperature range required for operation, and the ability of the solute to reform the dielectric. This reformation function is required in a working electrolyte to oxidize any segment of the dielectric film which might suffer electrical breakdown during operation. Thus, after any failure of the dielectric, the solute must immediately, under the influence of the potential imposed across the electrodes, reform the film to produce an insulation coating substantially that of the primary dielectric for, if it does not, excessive leakage as well as loss of capacity results.

Preferably, the solvent used forms from about 99% to about 80% by weight of the entire system. For optimum operational conditions, it has been found that the use of from about 3% to about 15% by weight of the solute in the electrolytic system produced the best working and formation electrolyte.

Electrolytic capacitors produced which incorporate the electrolyte of the invention are particularly advantageous when it is desired to operate the capacitor over a wide temperature range, that is from −55° C. to +125° C. without suffering appreciable change in capacitance over the entire range, or without introducing excessive losses, particularly at the low temperature end. Another characteristic of this electrolyte system which has not been found in those of the art is its exceptional stability. This stability is particularly useful in alternating current applications where the capacitor is of the non-polarized nature such as that set forth in Fig. 3, and manifests itself by extreme life of the unit in operation.

As many apparently widely embodiments of this invention may be made without departing from the spirit and scope thereof, it is to be understood that the invention is not limited to the specific embodiments hereof except as defined in the appended claims.

We claim:

1. An electrolytic capacitor having an operational temperature range of at least from in excess of 125° C. to −60° C., a plurality of electrodes of a valve metal, at least one of said electrodes coated with an oxide dielectric layer, and an electrolyte contiguous with said electrodes comprising a solute of an alkyl ammonium salt of a trialkyl ester of tetraphosphoric acid the anion of said acid having the formula:

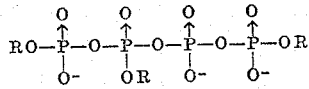

wherein R is a radical of the class consisting of lower alkyl and hydroxy substituted lower alkyl dissolved in a non-aqueous solvent, said solute present in from about 1% to about 20% by weight of the total electrolyte.

2. The capacitor of claim 1 in which the solute is tris-(triethylammonium)-tri-methyl-tetraphosphate.

3. An electrolytic capacitor having an operational temperature range of at least from in excess of 125° C. to −60° C. a plurality of electrodes of a valve metal at least one of said electrodes coated with an oxide dielectric layer and an electrolyte contiguous with said electrodes comprising a solute selected from the group consisting of the alkyl ammonium salts of esters of tetraphosphoric acid and pyrophosphoric acid dissolved in a proportion of from 1% to 20% to the electrolyte system in a nonaqueous solvent.

4. A capacitor of claim 3 in which said electrolyte is dissolved in dimethyl formamide.

5. An electrolytic capacitor having an operational temperature range of at least from in excess of 125° C. to −60° C. a plurality of electrodes of a valve metal at least one of said electrodes coated with an oxide dielectric layer and an electrolyte contiguous with said electrodes comprised of an alkyl ammonium salt of an ester of tetraphosphoric acid dissolved in a proportion of from 1% to 20% of the electrolyte system in an non-aqueous solvent.

6. An electrolytic capacitor having an operational temperature range of at least from in excess of 125° C. to −60° C. a plurality of electrodes of a valve metal at least one of said electrodes coated with an oxide dielectric layer and an electrolyte contiguous with said electrodes comprised of an alkyl ammonium salt of an ester of pyrophosphoric acid dissolved in a proportion of from 1% to 20% of the electrolyte system in a non-aqueous solvent.

References Cited in the file of this patent
UNITED STATES PATENTS

| Number | Name | Date |
|---|---|---|
| 2,036,669 | Yngve | Apr. 7, 1936 |
| 2,155,086 | Georgiev | Apr. 18, 1939 |
| 2,165,090 | Clark | July 4, 1939 |
| 2,742,379 | Schofield | Apr. 17, 1956 |
| 2,758,093 | Ernst | Aug. 7, 1956 |
| 2,801,221 | Robinson | July 30, 1957 |
| 2,841,771 | Dunleavey | July 1, 1958 |